Patented Feb. 27, 1951

2,543,306

UNITED STATES PATENT OFFICE 2,543,306

POLYMERIZATION OF STYRENES IN THE PRESENCE OF ALCOHOL DILUENTS AND UNSATURATED PEROXIDES

Hanns Peter Staudinger, Ewell, England, assignor to The Distillers Company Limited, Edinburgh, Scotland, a British company No Drawing. Application August 24, 1944, Serial No. 551,067. In Great Britain July 21, 1943

Section 1, Public Law 690, August 8, 1946
Patent expires July 21, 1963

6 Claims. (Cl. 260—93.5)

This invention relates to the preparation of synthetic resins by the polymerisation of styrene, alpha-methyl styrene or nuclear-alkyl-substituted styrenes or mixtures of these substances.

The methods usually employed for polymerising styrene to resins of high molecular weight consist either of heating the monomeric substance, in the presence or absence of polymerisation catalysts, either by itself, or in the presence of a solvent-diluent (by which is meant a solvent for both monomer and polymer) or a non-solvent-diluent (by which is meant a substance which is a solvent for the monomer and a non-solvent for the polymer), or in the form of an aqueous emulsion. It is known that various factors, amongst which are the temperature of polymerisation, the concentration of the monomer in the diluent, the catalyst concentration and the proportion of those substances, if present, which inhibit or retard polymerisation, influence the molecular weight of the resulting polymer. In most cases, particularly in the polymerisation of the pure monomer, the molecular weight remains fairly constant throughout polymerisation. On the other hand, if polymerisation is carried out in a solvent-diluent, which, as above defined, is a solvent for the monomer as well as for the polymer, the molecular weight of the polymer obtained (as determined by viscosity measurements) decreases with progressive polymerisation.

I have now found that I can prepare polymers of styrene or styrene derivatives, as defined above, which show, with progressive polymerisation, an increase of viscosity and which becomes decreasingly soluble and may even become insoluble in contrast to polymers prepared in the absence of cross-linking agents (as defined by H. Staudinger and W. Heuer in Berichte der Deutschen Chemischen Gesellschaft, volume 67 (1934) pages 1164 et seq.) which are soluble in benzene, carbon tetrachloride and toluene.

According to the present invention, a process for the production of a synthetic resin comprises polymerising styrene, alpha-methyl-styrene or a nuclear-alkyl-substitution product thereof separately or in any combination by the action of heat in the presence of a peroxidic catalyst containing the radicle of an unsaturated organic acid as hereinafter defined, and in the presence of a non-solvent-diluent, as hereinbefore defined, at a temperature not in excess of 150° C. The unsaturated organic acids whose radicles can be present in the peroxidic catalyst are those compounds which contain a pair of aliphatic double bonded carbon atoms but which have no pronounced tendency to polymerisation by themselves; examples of such compounds are crotonic acid and cinnamic acid. Compounds such as methacrylic acid, which has a pronounced tendency to polymerise, should not be used as there would be co-polymerisation between the acid (produced by decomposition of the peroxidic catalyst) and the styrene or alkyl-substituted styrene; thus methacrylic peroxide is not a peroxidic catalyst which falls within the type of catalyst to be used in carrying this invention into effect.

I find that when styrene is polymerised in the presence of a non-solvent diluent in accordance with the process of this invention, polymers are obtained which, with progressive polymerisation, increase in viscosity until they become insoluble in solvents such as benzene, toluene and carbon tetrachloride.

I have observed that, when polymerisation is carried out with the aid of benzoyl peroxide as catalyst instead of a peroxidic catalyst containing the radicle of an unsaturated organic acid as hereinbefore defined, but under otherwise identical conditions, the viscosity of the polymers does not increase appreciably with progressive polymerisation. Again, on the other hand, if polymerisation of styrene is carried out in presence of, for example, crotonyl peroxide, and in the presence of a diluent such as benzene, which is a solvent for both the monomer and the polymer (i. e. a solvent-diluent), no increase in the viscosity of the resulting polymers with progressive polymerisation is obtained.

From the results given below in the table, it can be seen that the viscosity increase and the insolubility of the polymer is due to the combination of two factors, namely the presence of the selected type of peroxide catalyst and the non-solvent diluent.

The nature of the non-solvent diluent is important. I have, for example, ascertained that methanol has the greatest precipitating action for the polymer. Other alcohols such as ethyl alcohol, amyl alcohol or di-acetone alcohol may also be used. To accentuate the precipitating action in the latter cases I prefer to add to the alcohol a small amount of water. Other liquids which are inert and are non-solvent diluents, for example, acetic acid or heptane, may also be used. Thus, for example, the polymerisation may be carried out in ethyl alcohol containing 4% by weight of water, or acetic acid containing 3% to 6% by weight of water.

The following table shows the variation in the rate of polymerisation and the relative viscosity of the resulting polymers in relation to time. The relative viscosity expressed by the fraction $$\frac{N_s}{N_0}$$

in which $N_s$ is the viscosity of the solution and $N_0$ the viscosity of the solvent, was determined by means of tests on a 2% by weight solution of the polymer in benzene at 25° C. in a No. 2 U-tube viscometer B. S. S. 188 (1937).

*Polymerisation of a mixture of 70% by volume of styrene and 30% by volume of methanol in the presence of 0.2% by weight of crotonyl peroxide at 80° C.*

| Time (hrs.) | Yield, Per Cent | Relative Viscosity |
|---|---|---|
| 2 | 30.0 | 2.1 |
| 6 | 53.8 | 2.32 |
| 10 | 67.5 | 2.58 |
| 24 | 83.2 | 3.94 |
| 30 | 85.0 | 4.63 |
| 44 | 87.1 | 6.58 |
| 60 | 87.6 | insoluble |

The amount of non-solvent diluent in the polymerisation mixture is important, as it was found that the rise in the viscosity of the polymers is more pronounced in presence of higher proportions of non-solvent diluents; to show this effect, mixtures of styrene and methanol have been polymerised at 80° C. in the presence of a 0.2% by weight of crotonyl peroxide in the following proportions by weight: (A) 70 parts styrene to 30 parts methanol, (B) 60 parts styrene to 40 parts methanol and (C) equal parts of styrene and methanol and the results are tabulated below:

| Time (Hrs.) | | | 2 | 6 | 10 | 18 | 24 | 44 | 60 |
|---|---|---|---|---|---|---|---|---|---|
| Polymerisation | A | per cent yield | 30.0 | 53.8 | 67.5 | 80.3 | 83.2 | 87.1 | 87.6 |
| | | relative viscosity | 2.1 | 2.32 | 2.58 | 3.25 | 3.94 | 6.58 | insol. |
| Mixture | B | per cent yield | 28.2 | 50.0 | 59.5 | 67.5 | 68.0 | 68.6 | 69.1 |
| | | relative viscosity | 1.47 | 1.63 | 2.10 | 4.65 | insol. | insol. | insol. |
| | C | per cent yield | 26.0 | 44.4 | 56.1 | 62.2 | 63.5 | 63.8 | 64.1 |
| | | relative viscosity | 1.15 | 1.42 | 2.05 | insol. | insol. | insol. | insol. |

In general, a concentration of from 10% to 60% by weight of non-solvent diluent in the mixture undergoing polymerisation is preferred. Greater dilutions also cause a rise in the viscosity of the resulting polymers, but the rate of reaction and the efficiency of polymerisation is reduced and the process becomes less economical. At the same time, the initial molecular weight (expressed in terms of viscosity) is lower, the greater is the dilution. In addition, when using less than 10% by weight, or even less than 5% by weight, of a non-solvent diluent in the mixture, the reaction is liable to cause temperature fluctuations within the mass owing to the exothermic nature of the polymerisation reaction. This is particularly disadvantageous when working in large batches, where heat dissipation is more difficult to achieve.

I prefer to use an amount of catalyst between 0.05% and 1% by weight of the total mixture; less catalyst may, however, be used at the expense of time of polymerisation. Higher proportions of catalyst, may be employed, but these may lead to products of less desirable properties or may lead to a rate of polymerisation which is too great for industrial application. The effect of catalyst concentration may be seen from the following table in which the results are given for polymerisation at 80° C. of mixtures of 70% by volume of styrene and 30% by volume of methanol with 0.2% and 0.1% by weight of crotonyl peroxide as catalyst.

| Time (hrs.) | Catalyst conc. in mixture (percentage weight) | | | |
|---|---|---|---|---|
| | 0.1 | | 0.2 | |
| | Per Cent Yield | Relative Viscosity | Per Cent Yield | Relative Viscosity |
| 6 | 38.0 | 2.41 | 53.8 | 2.32 |
| 10 | 45.5 | 2.47 | 67.5 | 2.58 |
| 24 | 60.2 | 2.85 | 83.2 | 3.94 |
| 48 | 72.2 | 4.20 | 87.2 | 6.51 |
| 72 | 81.6 | -(1) | 88.0 | (2) |

[1] Partially insoluble.
[2] Insoluble.

(The solution obtained at 48 hours using 0.2% by weight of catalyst appeared to contain fragments of undissolved, highly swollen polymer.)

It is preferable to carry out polymerisations at temperatures between about 50° and 100° C. Here again, the polymers prepared by carrying out polymerisation at lower temperatures show more valuable properties than the polymers prepared at high temperatures, but, on the other hand, decrease in temperature considerably decreased the rate of polymerisation.

The polymerisation can be carried out with or without agitation in glass-lined vessels or in vessels of stainless steel or in vessels with tinned or enamelled surfaces. In many cases, where methanol is used as a diluent and the temperature of polymerisation is above the boiling point of the mixture, pressure vessels have to be used.

It is also possible, as an alternative, to use a reflux condenser in conjunction with the polymerisation vessel when polymerising at temperatures higher than the corresponding boiling point of the mixture.

The following examples illustrate the manner in which the invention can be carried into effect.

*Example 1*

A mixture of 600 g. styrene and 300 g. methanol to which had been added 2.7 g. crotonyl peroxide, was heated in an enamelled pressure vessel for 48 hours at 85° C. At the end of this period the pressure was released and the methanol blown off through a condenser. When most of the methanol had evaporated, the contents of the vessel were heated to 120° C. and vacuum was applied so as to remove residual diluent and unpolymerised styrene. The polymer was obtained in a yield of 91% and found to be insoluble in benzene. On extruding this material through a heated die, it flowed very freely.

Example 2

A mixture of ten parts by volume of styrene, 9.5 parts by volume of ethanol and 0.5 part by volume of water were polymerised in the presence of .05 part by weight of crotonyl peroxide at 60° C. After 72 hours the polymer was obtained in 82% yield; it was insoluble in benzene but showed satisfactory flow properties.

Example 3

350 ccs. of monomeric styrene (of 93.8% purity) together with 150 ccs. methanol were polymerised in the presence of 1.5 g. cinnamyl peroxide, using a cylindrical enamelled pressure vessel. This vessel was immersed in a water bath at 90° C. for 48 hours. At the end of that period, methanol was vented off and the polymer transferred on a tray into a vacuum oven, heated to 100° C. The polymer after 24 hours heating at 100° C. under 25 mm. pressure, was in the form of a cellular lump which could easily be broken up. This polymer was found to swell but not dissolve in benzene or toluene. A polymer prepared under identical conditions, but using an equivalent amount of benzoyl peroxide instead of cinnamyl peroxide, was soluble. (Relative viscosity=2.05 in a 2% benzene solution at 25° C. in B. S. S. 188 (1937) U-tube No. 2 viscometer). In addition the cinnamyl peroxide polymer gave, when plasticised, with 40% by weight of the plasticiser known under the registered trademark Polymeth (consisting of the mixed lower polymers of alpha-methyl styrene) a pliable composition of considerably less tackiness than the polymer obtained using benzoyl peroxide.

What I claim is:

1. A process for the production of a synthetic resin which comprises polymerising a compound of the class consisting of styrene and alpha-methyl styrene by heating said compound to a temperature not in excess of 150° C. in the presence of a peroxidic catalyst containing the radicle of an unsaturated organic acid of the group consisting of crotonic and cinnamic acids, and in the presence of a diluent consisting of an aliphatic alcohol containing not more than five carbon atoms in the molecule.

2. A process according to claim 1 wherein said diluent is methanol.

3. A process for the production of a synthetic resin which comprises heating styrene to a temperature of from 50° to 100° C. in the presence of methanol and in the presence of crotonyl peroxide.

4. A process for the production of a synthetic resin which comprises heating, to a temperature of from 50° to 100° C. a reaction mixture consisting of styrene, crotonyl peroxide and from 10% to 60% by weight of methanol.

5. A process for the production of a synthetic resin which comprises heating styrene to a temperature of from 50° to 100° C. in the presence of methanol and in the presence of cinnamyl peroxide.

6. A process for the production of a synthetic resin which comprises heating, to a temperature of from 50° to 100° C. a reaction mixture consisting of styrene, cinnamyl peroxide and from 10% to 60% by weight of methanol.

HANNS PETER STAUDINGER.

REFERENCES CITED

The following references are of record in the file of this patent:

UNITED STATES PATENTS

| Number | Name | Date |
| --- | --- | --- |
| 1,683,404 | Ostromislensky | Sept. 4, 1928 |
| 2,300,566 | Hahn | Nov. 3, 1942 |
| 2,310,961 | Kropa | Feb. 16, 1943 |
| 2,366,306 | Alexander | Jan. 2, 1945 |
| 2,381,561 | Staudinger | Aug. 7, 1945 |

FOREIGN PATENTS

| Number | Country | Date |
| --- | --- | --- |
| 462,165 | Great Britain | Feb. 26, 1937 |

OTHER REFERENCES

Brajnikoff: Plastics (London, July 1942), pp. 230–238.